(12) United States Patent
Bergvall (10) Patent No.: US 7,836,998 B2
(45) Date of Patent: Nov. 23, 2010

(54) CRASH SENSOR

(75) Inventor: Bengt Allan Bergvall, Jönköping (SE)

(73) Assignee: Autoliv Development AB, Vargarda (SE)

( * ) Notice: Subject to any disclaimer, the term of this patent is extended or adjusted under 35 U.S.C. 154(b) by 405 days.

(21) Appl. No.: 11/664,626

(22) PCT Filed: Aug. 23, 2005

(86) PCT No.: PCT/SE2005/001227

§ 371 (c)(1), (2), (4) Date: Jun. 11, 2008

(87) PCT Pub. No.: WO2006/038841

PCT Pub. Date: Apr. 13, 2006

(65) Prior Publication Data

US 2008/0315568 A1    Dec. 25, 2008

(30) Foreign Application Priority Data

Oct. 6, 2004    (GB)    .................. 0422183.4

(51) Int. Cl.
  *B60K 28/10*    (2006.01)
(52) U.S. Cl. .................................. 180/274
(58) Field of Classification Search ........... 180/274, 180/271, 282; 280/735
  See application file for complete search history.

(56) References Cited

U.S. PATENT DOCUMENTS

| | | | |
|---|---|---|---|
| 5,005,414 A | | 4/1991 | Holland et al. |
| 5,351,542 A | | 10/1994 | Ichimura et al. |
| 5,508,676 A | | 4/1996 | Grange et al. |
| 6,015,163 A | * | 1/2000 | Langford et al. ............ 280/735 |
| 6,169,479 B1 | * | 1/2001 | Boran et al. ................ 340/436 |
| 6,328,126 B2 | * | 12/2001 | Breed et al. ................ 180/274 |
| 6,744,354 B2 | * | 6/2004 | Stephan et al. ............ 340/436 |
| 6,929,282 B1 | * | 8/2005 | Zoratti et al. ............... 280/735 |
| 7,098,778 B1 | * | 8/2006 | Zoratti et al. ............... 340/436 |
| 2004/0007859 A1 | * | 1/2004 | Shields et al. .............. 280/735 |
| 2004/0174006 A1 | * | 9/2004 | Yamashita ................. 280/735 |

FOREIGN PATENT DOCUMENTS

| | | |
|---|---|---|
| DE | 42 37 404 A1 | 11/1994 |
| EP | 0 775 613 A3 | 11/1998 |
| GB | 2180655 | 4/1987 |
| GB | 2 248 113 | 3/1992 |
| JP | 6183316 | 7/1994 |
| WO | WO 0123224 | 4/2001 |

OTHER PUBLICATIONS

International Search Report for PCT/SE2005/001227 with Written Opinion, Mar. 13, 2006.

* cited by examiner

*Primary Examiner*—Faye M. Fleming
(74) *Attorney, Agent, or Firm*—Brinks Hofer Gilson & Lione (57) ABSTRACT

A crash sensor comprising a support arrangement for supporting opposed ends of a yieldable element directly on one of an outer skin of a vehicle and a component adjacent to the outer skin with the yieldable element substantially parallel with the outer skin of the vehicle. A sensor arrangement in the form of resistors mounted on the yieldable element to generate a signal in response to deformation or bending of the yieldable element. A stiffness and a mass of the yieldable element is such that a period for a complete oscillation of the element at its resonance frequency is of at least 2 milliseconds.

32 Claims, 8 Drawing Sheets

CRASH SENSOR

CROSS REFERENCE TO RELATED APPLICATIONS

This application claims priority to PCT application WO 2006/038841 filed Aug. 23, 2005 and GB patent application 0422183.4 filed Oct. 6, 2004.

FIELD OF THE INVENTION

THE PRESENT INVENTION relates to a crash sensor or more particularly relates to a crash sensor for use in a motor vehicle.

BACKGROUND OF THE INVENTION

It has been proposed previously to provide various types of crash sensor in a motor vehicle. Typically the crash sensors generate output signals which are used to control the deployment of safety devices such as air-bags, or pretensioners which pretension safety-belts.

It is known that a crash sensor located close to the outer skin of the vehicle detector crash more quickly than a central accelerometer which is secured to the chassis of the vehicle.

Many vehicles are provided with sensors located in the doors or other parts of the side of the vehicle and also in the region of the front and rear bumpers or fenders of the vehicle, in addition to a central accelerometer.

If the sensors located close to the outer skin of the vehicle are accelerometers, such accelerometers will be exposed to a high acceleration when that part of the outer skin is deformed in a crash. However, the accelerometer signal will represent the acceleration of the accelerometer housing, which is located only at one point on the skin of the vehicle, and the acceleration at one point may be very different to the acceleration at an adjacent point, especially if there is an impact with a relatively small object such as, for example, a street light or lamp-post.

In a typical situation, an impact will cause the outer skin of the vehicle to change its speed, so that, over the course of at most a few milliseconds, the outer skin changes its absolute speed from the speed of the vehicle to the speed of the impacting object, because the outer skin of the vehicle is relatively soft. An accelerometer which is mounted adjacent the skin of a vehicle will thus sense one very high pulse of acceleration in a typical impact situation.

A centrally mounted accelerometer which is mounted on the chassis of the vehicle, for example, will sense acceleration, in an impact situation, much later than an accelerometer located adjacent the outer skin of the vehicle in the region of the impact. The reason for this is that, in many impact situations, the chassis of the vehicle will only accelerate or decelerate substantially when a "crumple zone" has crumpled, absorbing some of the energy of the impact.

Typically, a safety device such as an air-bag or seat-belt pretensioner is triggered in response to the integrated acceleration signal from one or more accelerometers exceeding a predetermined threshold level. This means that if the impact speed is low, no triggering of the safety device will occur.

To provide an optimum degree of response, a vehicle should be provided with a central accelerometer and also accelerometers located adjacent the outer skin of the vehicle in all regions of the vehicle where an impact could occur. If the sensors located adjacent the outer skin of the vehicle are accelerometers, a substantial number of accelerometers will be needed, and this is expensive.

The present invention seeks to provide an improved crash sensor arrangement.

SUMMARY OF THE INVENTION

In at least one embodiment of the present invention, there is provided an impact sensor to sense an impact in a vehicle, the sensor comprising an elongate yieldable element, and a support arrangement to support opposed ends of the yieldable element directly on the outer skin of the vehicle or on a component adjacent the outer skin of the vehicle with the yieldable element substantially parallel with the outer skin of the vehicle, wherein the yieldable element is provided with a sensor arrangement responsive to bending of the yieldable element to create at least one signal in response to the yieldable element being bent, the stiffness and mass of the yieldable element being selected to achieve a period for a complete oscillation of the element at its resonance frequency of at least 2 milliseconds.

A further aspect is that the period for a complete oscillation is between 5 milliseconds and 20 milliseconds.

In another aspect, the supports at the opposed ends of the yieldable element are spaced apart by a distance of at least 50 millimeters.

In yet another aspect, the supports are spaced apart by a distance between 100 and 300 millimeters.

In at least one other embodiment of the present invention there is provided an impact sensor to sense an impact in a vehicle, the sensor comprising an elongate yieldable element, and a support opposed ends of arrangement to support the yieldable element directly on the outer skin of the vehicle or on a component adjacent the outer skin of the vehicle with the yieldable element substantially parallel with the outer skin of the vehicle, wherein the yieldable element is provided with a sensor arrangement responsive to bending of the yieldable element to create at least one signal in response to the yieldable element being bent, the distance between the supports being at least 50 millimeters.

A further aspect is that the distance between the supports is between 100 and 300 millimeters.

In another aspect, the stiffness and mass of the yieldable element are selected to achieve a period for a complete oscillation of the element at its resonant frequency of at least 2 milliseconds.

In yet another aspect, the sensor may be mounted in a vehicle.

It is also another aspect that the sensor forms part of a strip constituted by a plurality of substantially identical sensors.

Still another aspect is that a single yieldable element is provided which constitutes a plurality of the elongate yieldable elements of the sensors in the strip of sensors.

In further aspect, the single yieldable element is provided with a weak mechanical coupling between adjacent sensors.

It is also another aspect that the weak mechanical coupling is constituted by a plurality of cuts extending from opposite sides of the yieldable element.

In another aspect, the sensor arrangement comprises resistors mounted on opposed faces of the yieldable element and a processor to process signals from the resistors.

Still another aspect is that each sensor is provided with one resistor on each side of the yieldable element, the resistors being connected to form a voltage divider to which a source of potential is attached, a tap being taken from the junction between the resistors which is connected to the processor.

In another aspect, each sensor is provided with two resistors on each side of the yieldable element, the resistors being connected as a Wheatstone bridge.

In a further aspect, each resistor is formed by a conductive rack formed on one face of the yieldable element.

In yet another aspect, the yieldable element is a printed circuit board.

In at least one embodiment the yieldable element comprises a thermoset reinforced resin core with conductive tracks formed on each of the two opposed faces of the core.

In at least another embodiment the supports are formed integrally with a tube, the yieldable element being mounted within the tube.

In another aspect movement of the central part of the yieldable element located between the supports in one direction is restricted to prevent compete oscillation.

A further aspect is that a damping layer is located adjacent one face of the yieldable element.

In at least one other embodiment, there is provided an impact sensor to sense an impact in a vehicle, the sensor comprising an elongate yieldable element, and a support arrangement to support opposed ends of the yieldable element directly on the outer skin of the vehicle or on a component adjacent the outer skin of the vehicle with the yieldable element substantially parallel with the outer skin of the vehicle, wherein the yieldable element is provided with a sensor arrangement responsive to bending of the yieldable element to create at least one bend signal in response to the yieldable element being bent, the sensor further creating an output signal when the bend signal exceeds a threshold, so that no output signal will be generated if the impacting speed is below a predetermined speed threshold or if the deformation of the outer skin is below a predetermined deformation threshold.

In a further aspect, the natural period of oscillation of the yieldable element $T_0$ is approximately four times the period of time between the instant of impact and the latest possible instant corresponding to said speed threshold for generating the output signal.

In another aspect, in use, an output signal is generated in response to a movement of the central part of the yieldable element in excess of a bend threshold which is between 3 and 30 mm.

In yet another aspect, the speed threshold is between 15 and 60 kilometers per hour.

It is also another aspect that there is a free space of at least 5 millimeters adjacent at least one side of the yieldable element.

In another aspect, the sensor is mounted on the door, on the side, in the front or on the rear of a vehicle.

Still another aspect is that the sensor is mounted directly to the outer skin of a vehicle.

In a further aspect, the sensor is mounted to an internal reinforcing element, the internal reinforcing element being mounted immediately adjacent the skin of a vehicle.

In at least another embodiment of the present invention there is provided an impact sensor system to sense an impact in a vehicle comprising an elongate yieldable strip, the strip comprising two or more elongate yieldable elements, distributed along the strip, each element being provided with a support arrangement to support opposed ends of the yieldable element directly on the outer skin of the vehicle or on a component adjacent the outer skin of the vehicle with the yieldable element substantially parallel with the outer skin of the vehicle, wherein the yieldable strip is provided with one or more sensor arrangements, each being responsive to bending of one or more of the yieldable elements to create at least one signal in response to at least one yieldable element being bent.

In another aspect each yieldable element is provided with one or said sensor arrangements.

Further objects, features and advantages of the invention will become apparent from consideration of the following description and the appended claims when taken in connection with the accompanying drawings.

DETAILED DESCRIPTION

Figure 1:
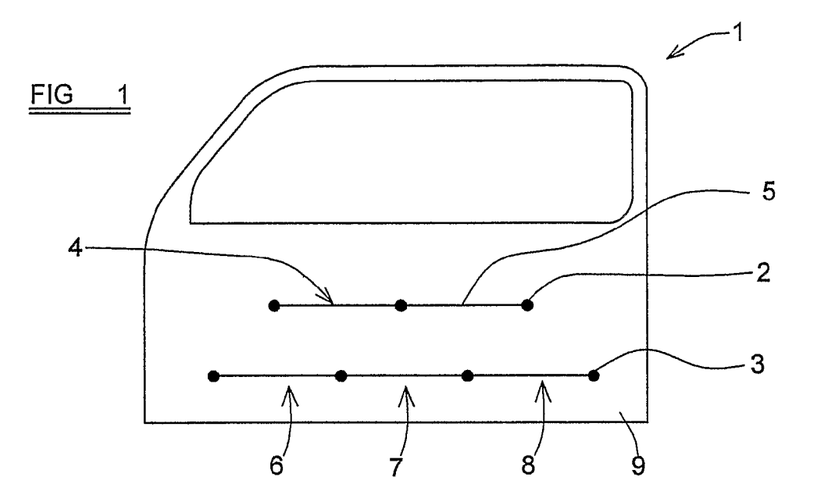
FIG. 1 is a perspective view part of a door of a vehicle provided with a crash sensor arrangement in accordance with the present invention.

FIG. 1 illustrates a door 1 of a vehicle embodying the principles of the present invention. The door 1 is provided with a sensor arrangement to sense a side impact. The sensor arrangement, in the illustrated door, consists of two elongate strips 2,3, the first strip 2 comprising two sensor units 4,5 and the second strip comprising three sensor units 6,7,8.

The strips, in this embodiment, are disposed horizontally in the side door, and are vertically spaced apart so that, should a side impact occur, the door will deform in the region of at least one of the sensor units 4 to 8.

Referring now to FIGS. 2 to 8, it is to be appreciated that the sensor units 4 to 8 of the strips 2,3 are mounted directly to the inner surface of the outermost skin 9 of the door. The outermost skin will be formed of relatively thin sheet metal or, in some vehicles, a relatively thin sheet of plastic, and thus the outer skin of the vehicle will deform readily in a side impact situation. A plurality of support arms 10 are directly mounted on the skin 9 and extend inwardly from the skin 9 of the door, the supports 10 being in two parallel rows. The supports in each of the rows are transversely aligned with each other. Each support 10 has, adjacent its free end, an open slot or recess 11 which is directed towards the other transversely aligned support.

Figure 2:
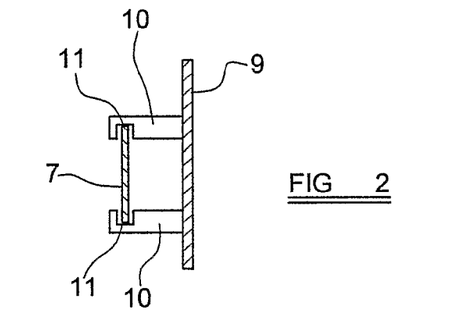
FIG. 2 is a vertical sectional view taken through the door showing part of a sensor unit in accordance with the present invention.
Figure 3:
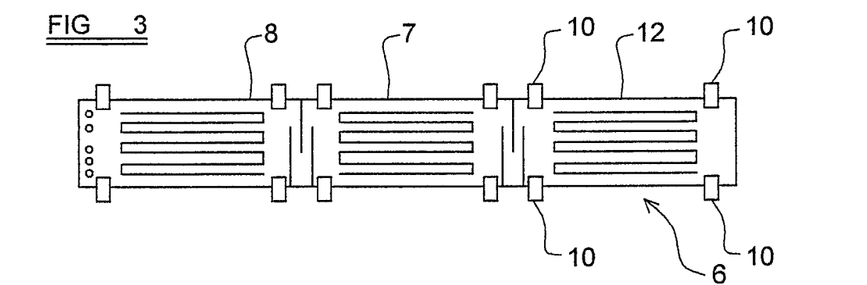
FIG. 3 is an elevational view from the interior of the door illustrating sensor units in accordance with the present invention.
Figure 4:
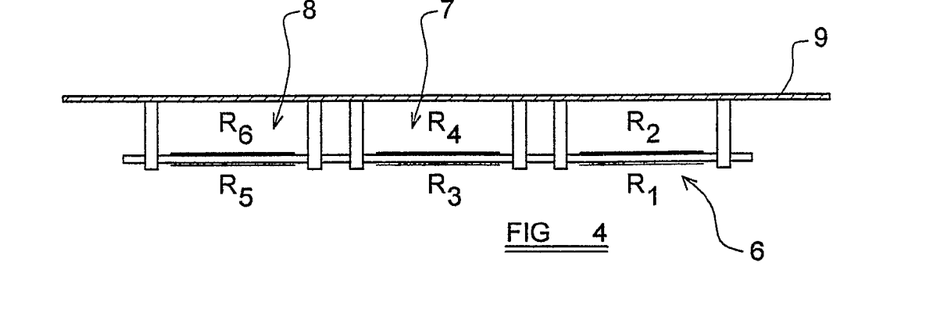
FIG. 4 is horizontal sectional view through the door, taken from above, showing the sensor units of FIG. 3.

Mounted in the supports is a single printed circuit board 12, of elongate rectangular form, the edges of the printed circuit board being received within the slots or recesses 11 of the supports 10. It is thus to be understood that the rows of support 10 are spaced apart by a distance which is substantially the same as the width of the printed circuit board 12.

The printed circuit board 12 is divided into three regions forming the sensor units 6,7 and 8. A support 10 is provided adjacent the four corners of each of the three regions.

The printed circuit board 12 is a double-sided printed circuit board and, as can be seen from FIGS. 3 and 4, the printed circuit board is provided with resistors on each of the two opposed faces of the printed circuit board. Consequently, in the part of the printed circuit board corresponding to the sensor unit 6, two resistors R1,R2 are provided on opposite sides of the printed circuit board. In the part of the printed circuit board forming the sensor unit 7 resistors R3 and R4 are provided on opposite sides of the printed circuit board, and in the part of the printed circuit board forming the sensor unit 8, resistors R5 and R6 are provided. The resistors are in the form of "strain gauge" resistors, that is to say resistors whose resistance will vary upon deflection of the printed circuit board.

The supports 10 are of such a length that the printed circuit board may flex by at least 5 mm at its mid point in either direction. Thus at least 5 mm of free space is provided on either side of the printed circuit board.

Figure 5:
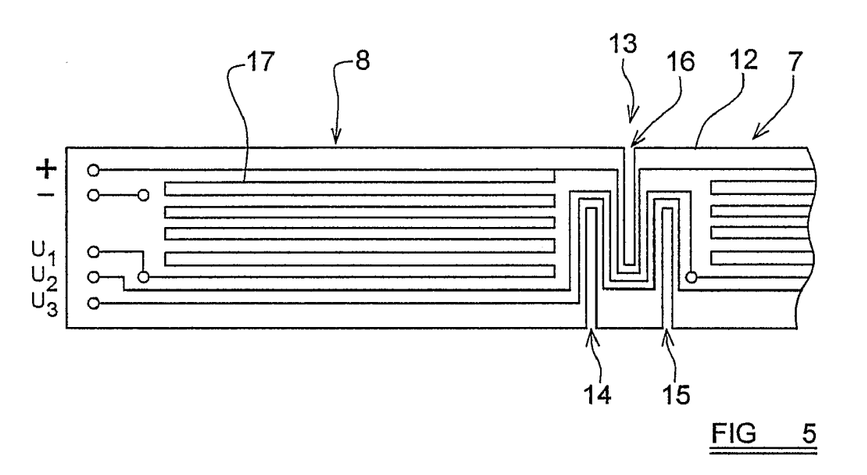
FIG. 5 is a view of part of a printed circuit board used in forming the sensor units of FIGS. 2 to 4.
Figure 6:
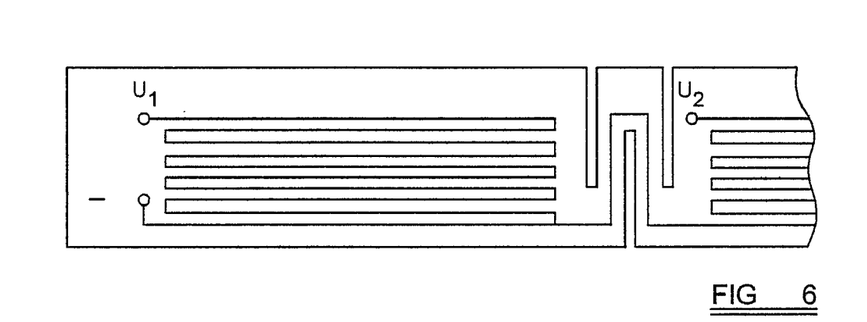
FIG. 6 is a view of the other side of the printed circuit board seen in FIG. 5.

FIGS. 5 and 6 illustrate one end part of the printed circuit board 12 illustrating the part of the printed circuit board that forms the sensor unit 8 and a portion of the printed circuit board that forms the sensor unit 7.

Initially it is to be noted that in the junction region 13, between the parts of the circuit board which form the sensor unit 8 and sensor unit 7 the printed circuit board is provided with two spaced apart cuts 14, 15 which extend more than halfway across the printed circuit board from one side edge of the board, and, at a position between these two cuts, a further cut 16 which extends over halfway across the printed circuit board from the other side edge of the circuit board. The cuts 14, 15, 16 are provided in part of the circuit board which is located between the supports 10 which support the region 8 of the printed circuit board which forms the sensor unit 8 and the supports 10 which support that part of the printed circuit board that forms the sensor unit 7. The cuts are provided to form a coupling of low mechanical strength between the part of the printed circuit board that forms the sensor unit 8 and the part of the printed circuit board that forms the sensor unit 7 so that deformation of the part of the printed circuit board that forms the sensor unit 8, for example, is not transferred to that part of the printed circuit board which forms the sensor unit 7.

As can be seen from FIGS. 5 and 6, the opposed faces of the printed circuit board are provided with complementary conductive tracks 17, 18. The conductive tracks define the resistors R1 to R6 described above with reference to FIG. 4, and contacts are provided at one end of the printed circuit board to enable circuitry, which will be described below with reference to FIG. 9, to be connected to the resistors present on the printed circuit board.

Figure 7:
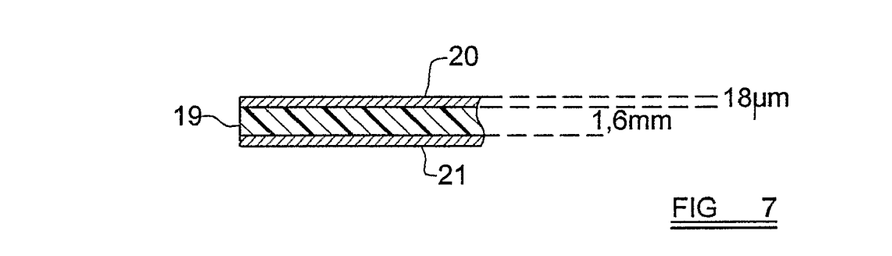
FIG. 7 is a sectional view through the printed circuit board of FIGS. 5 and 6.

As can be seen from FIG. 7 of the accompanying drawings, the printed circuit board is provided with a central planar substrate or "core" 19 formed from, for example, phenolic resin reinforced with fibre glass. Other suitable substrates known in the art for printed circuit boards may also be used. Each side of the printed circuit board is provided with a coating of copper 20, 21. The thickness of the substrate or core may be, for example, 1.6 mm, and the thickness of the copper layer may be, for example, 18 microns.

Figure 8:
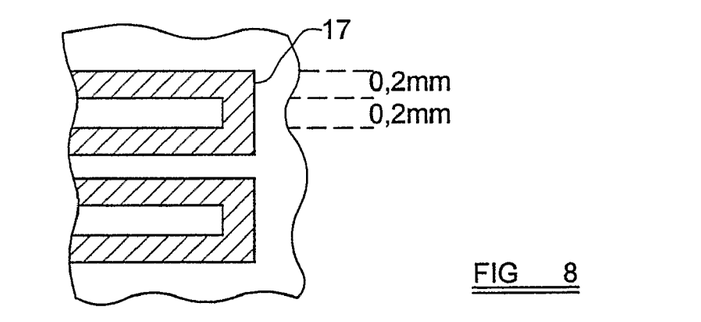
FIG. 8 is an enlarged view of part of a typical signal track as seen on the printed circuit board of FIGS. 5 to 7.

The conductive tracks 17, 18 as shown in FIGS. 5 and 6 may be formed using conventional etching techniques. Each conductive track may, as shown in FIG. 8, have a width of 0.2 mm for example. The spacing between adjacent parallel parts of the conductive track may also be about 0.2 mm.

Figure 9:
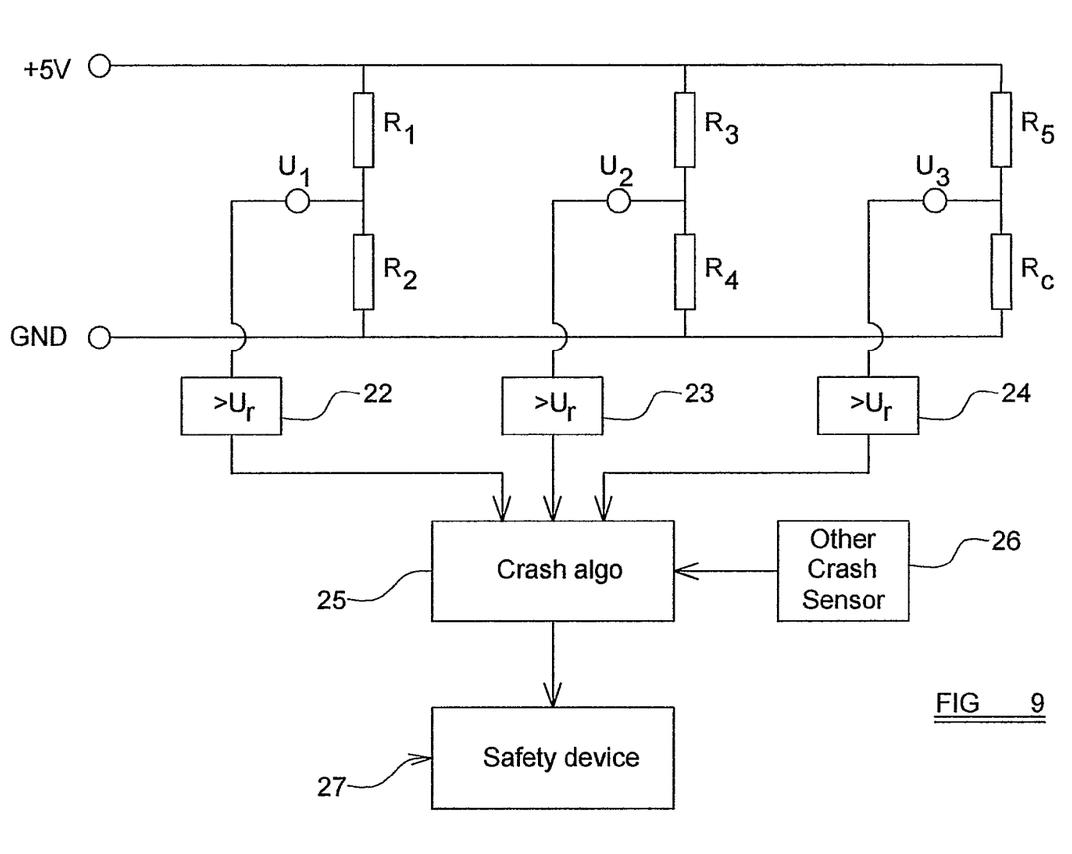
FIG. 9 is a block diagram showing three sensor units and associated signal processing circuitry.

Turning now to FIG. 9, it is to be understood that the resistors R1 and R2 are connected in series between a positive rail which may carry a positive voltage of 5 volts and ground. A tap U1 is provided at the junction of the two resistors. Similarly the resistors R3 and R4 are connected between the positive rail and ground, again with a tap U2 at the junction between the two resistors. Finally the resistors R5 and R6 are connected in a series between the positive rail and ground, and a further tap U3 is provided at the junction between the two resistors. Each tap is connected to respective threshold sensor 22, 23, 24 provided to sense when the potential present at the respective tap exceeds a predetermined threshold.

The threshold detectors 22 to 24 are connected to a processor 25 which performs a crash algorithm. Other crash sensors 26 may be provided which also provide data to the processor 25. The processor 25 controls a safety device 27 such as, for example, an air-bag or a seat-belt pretensioner.

As will be described in more detail below, if a side impact occurs, the skin 9 of the vehicle will be deformed rapidly. If the side impact occurs, for example, in the region of the sensor unit 8, the supports 10 supporting the sensor unit 8 will be driven inwardly, relative to the axis of the vehicle, with a very substantial acceleration. The four corners of that part of the printed circuit board that form the sensor unit 8 will consequently move inwardly towards the centre of the vehicle, whereas the central part of that region of the printed circuit board will tend to remain stationary due to inertia. The printed circuit board will consequently flex or bend, and may vibrate at its natural resource frequency. The bending of the printed circuit board will cause the resistive value of the resistors R5 and R6 to change, as the resistors are strain gauge resistors. The change of resistive value of the resistors R5 and R6 will cause the output potential at the tap U3 to change, and to exceed a threshold if the impact is of a predetermined severity, such that the printed circuit board is deformed to a predetermined extent. If the potential at tap U3 exceeds the threshold, as sensed by the threshold sensor 24, an appropriate signal will be passed to the processor 25 which performs the crash algorithm. The processor 25 will thus receive data indicative of an impact of a predetermined severity in the region of the sensor unit 8. The processor 25, typically also using data from other crash sensors 26, will determine whether any particular safety device 27 present in the vehicle should be actuated, and may also determine the nature of the deployment of that safety device.

Figure 10:
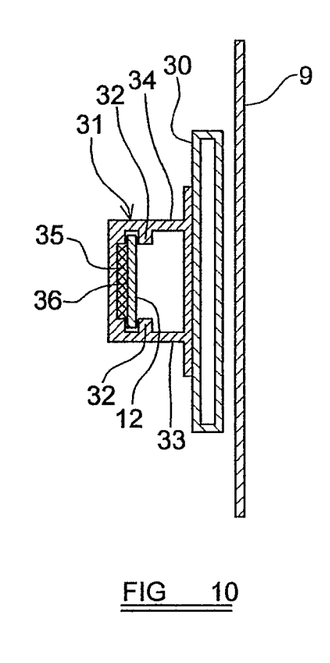
FIG. 10 is a view, corresponding to FIG. 2, but illustrating a modified embodiment of the invention.

Turning now to FIG. 10, a modified embodiment of the invention is illustrated. In the embodiment of FIG. 10, the sensor is not mounted on the skin 9 of the vehicle door, but instead is mounted on an internal reinforcing beam 30 of the vehicle. The beam 30 is, however, located adjacent the skin of the vehicle. In the embodiment of FIG. 10, the printed circuit board 12 is mounted within a rectangular sectioned tube 31. The tube 31 is provided, at spaced apart points, with inwardly directed lugs 32 formed on the upper and lower side walls 33, 34 of the tube. The lugs 32 are at positions corresponding the positions of the supports 10 in the embodiment illustrated with particular reference to FIGS. 2 to 4. The lugs are spaced from the end wall 35 that extends between the side-walls 33, 34. The lugs support the printed circuit board in position adjacent end wall 35 of the tube which is remote from the beam 30. However, sandwiched between the printed circuit board 12 and that end wall 35 of the tube is an elongate pad 3 of vibration damping material. The pad 36 may be partly received in a recess formed in the interior face of the end wall 35. On one side of the printed circuit board there is at least 5 mm of clear space such that the printed circuit board can flex.

It is to be appreciated that the sensor of the embodiment of FIG. 10 will operate in substantially the same way as that of the embodiments of FIGS. 2 to 9, save that after the printed circuit board, in an accident situation, has deflected "inwardly" the printed circuit board may only return to its initial substantially planar position, and subsequent vibration of the printed circuit board is damped by the pad 35 of damping material.

Turning now to FIGS. 11 to 14, a modified embodiment of the invention is described in which, in each part of the printed circuit board that forms a sensor unit, two resistors are provided on one side of the printed circuit board and two further resistors are provided on the other side of the printed circuit board enabling the resistors to be inter-connected in the form of a "Wheatstone" bridge.

Figure 11:
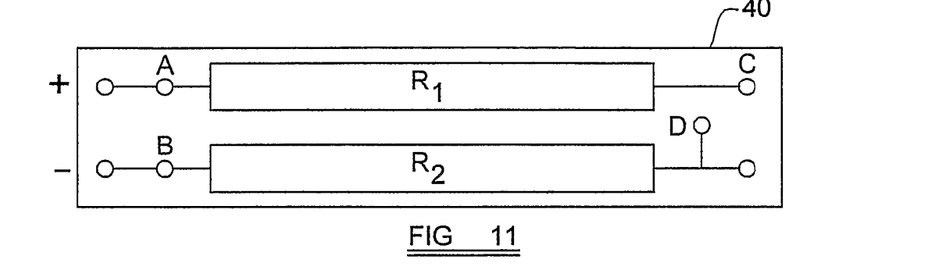
FIG. 11 is a view of one side of a printed circuit board in accordance with the present invention.
Figure 12:
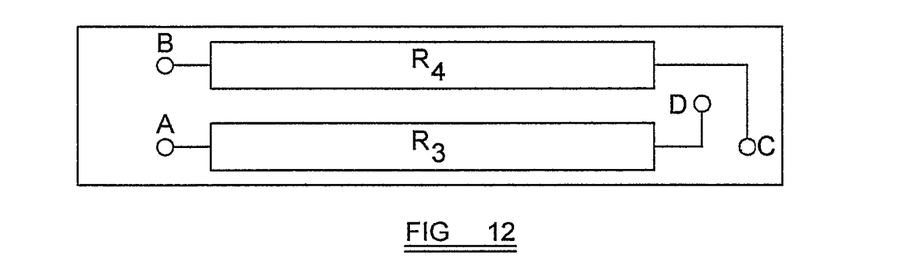
FIG. 12 is a view of the other side of the printed circuit board of FIG. 11.
Figure 13:
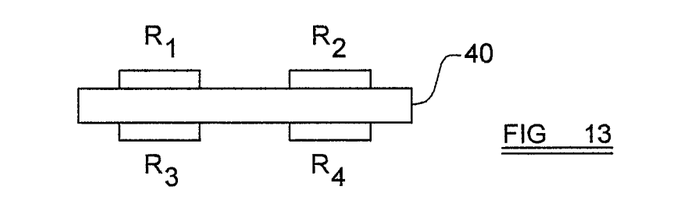
FIG. 13 is a sectional view of the printed circuit board of FIGS. 11 and 12.
Figure 14:
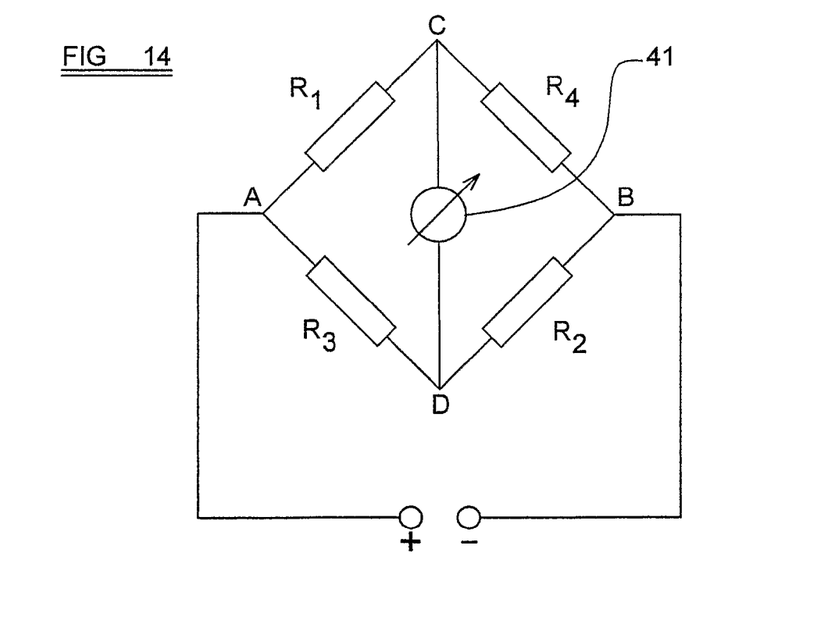
FIG. 14 is a block diagram illustrating the resistors located on the printed circuit board FIGS. 11 to 13.

Thus, referring to FIGS. 11 to 13, a printed circuit board 40 is illustrated, the printed circuit board having two resistors R1, R2 on one side thereof and two further resistors R3, R4 on the other side thereof. The printed circuit board is provided with appropriate connecting tracks, which inter-connect the resistors and which also facilitate the creation of the necessary circuitry to complete the Wheatstone bridge which is illustrated in FIG. 14.

It can been seen that in the Wheatstone bridge the resistors R1 and R4 are connected in series between a source of positive voltage, which may be at 5 volts, and ground, and the resistors R2 and R3 are also connected in series between the source of positive potential and ground. The two series connections are effectively in parallel extending between the terminals A and B. A potentiometer 41 is connected between the terminal C, at the junction between resistors R1 and R4 and the terminal D at the junction between the resistors R2 and R3. In the unflexed state of the printed circuit board the resistors have equal resistive value and no current is detected by the potentiometer 41. Should the board 40 flex, however, the values of the resistors will change, as they are strain gauge resistors, and a flow of electrical current will be detected by the potentiometer 41. The magnitude of the current flow would be dependent on the degree of flexing. It is to be understood, therefore, that the output of the potentiometer 41 is passed to a threshold measuring device equivalent to the threshold measuring devices 22 to 24 as described with reference to FIG. 9, and output of the threshold measuring device is passed to a processor which performs a crash algorithm equivalent to the processor 25.

Thus, in the embodiment of FIGS. 2 to 9, one resistor is provided on each side of the printed circuit board in each sensor unit, and the resistors are connected in series between a source of potential and ground, with the potential at the junction between the resistors being monitored and compared with the threshold. Moreover, in the embodiment of FIGS. 11 to 14, two resistors are provided on each side of the printed circuit board in each sensor unit and the resistors being connected in a Wheatstone bridge configuration. It is to be appreciated that the Wheatstone bridge configuration may be used with a physical structure equivalent to that of FIGS. 2 to 4 or in a structure equivalent to that of FIG. 10.

Figure 15:
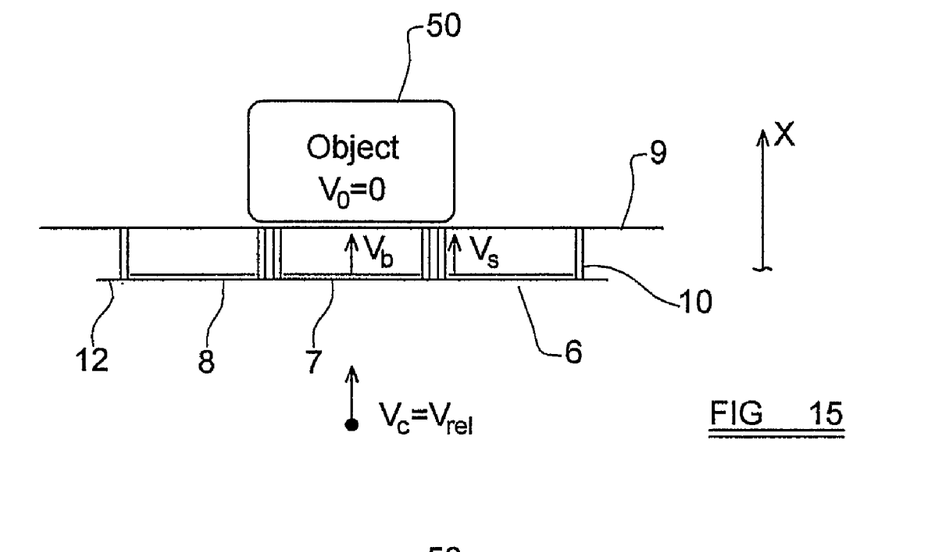
FIG. 15 is a diagrammatic view of a plurality of sensor units impacting with a fixed object in accordance with an embodiment of the present invention.
Figure 16:
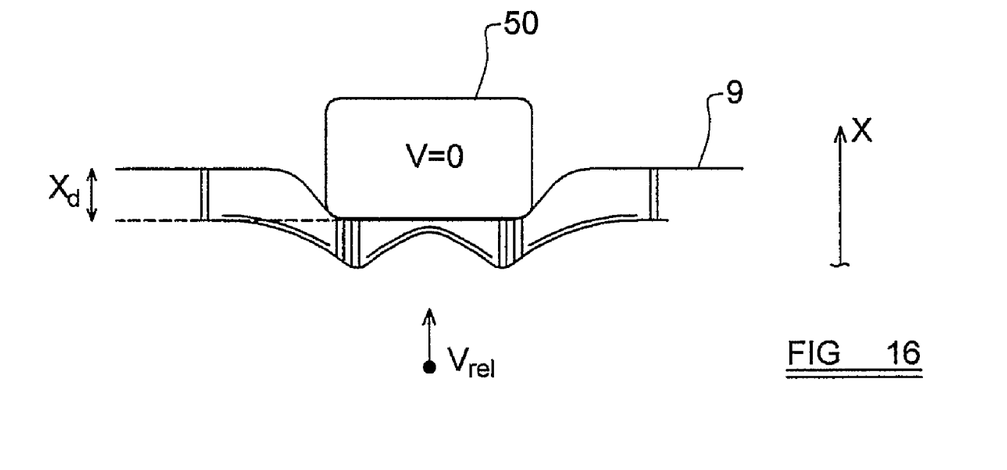
FIG. 16 is a view corresponding to FIG. 15 illustrating the sensor units shortly after the impact of FIG. 15.

Turning now to FIGS. 15 and 16, the situation that develops during an accident including a side impact will now be explained.

FIGS. 15 and 16 correspond generally to FIG. 4 and show the outer skin 9 of the vehicle, together with the associated supports 10 and a printed circuit board 12 defining three sensor units 6, 7, 8. The door 9 is mounted in a vehicle which has a lateral velocity $v_c$. The vehicle is about to have a side impact with a stationary object 50, the object consequently having a velocity of $v_o$ of zero. The velocity of the vehicle $v_c$ relative to the object is $v_{rel}$.

Initially the central part of the printed circuit board which forms the sensor unit 7 is travelling, together with the vehicle, at a speed $v_b$ which is the same as $v_c$ and similarly each support 10 is travelling at an initial speed of $v_s$ which is again the same as $v_c$.

When the side impact actually occurs, as shown in FIG. 16, the outer skin of the vehicle is deformed inwardly where the outer skin 9 impacts with the object 50. It can be seen that the two supports 10 which support that part of the printed circuit board which forms the sensor unit 7 are driven inwardly towards the interior of the vehicle. Due to inertia the printed circuit board between the support flexes or bends, initially flexing towards the skin of the vehicle. The flexing of the printed circuit board initiate a vibration or oscillation of the printed circuit board and the printed circuit board will oscillate at its natural resonant frequency. This frequency being determined by the stiffness and structure of the printed circuit board, and also by the mass of the printed circuit board.

Figure 17:
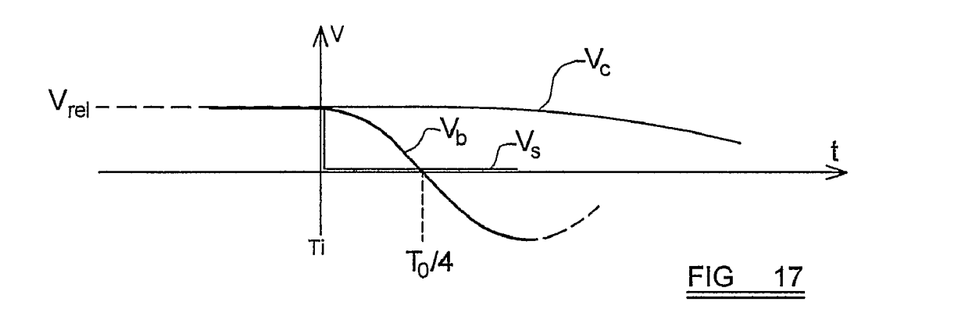
FIG. 17 is a graphical figure provided for the purposes of explanation.

Turning now to FIG. 17, which is a plot of velocity relative to time, it can be seen that the impact with the object 50 occurs at $T_i$. Prior to $T_i$, the vehicle, the support 10 and the printed circuit board 12 are travelling with a uniform velocity $v_c$ which is $v_{rel}$. At $T_i$ the velocity of the support of $V_s$ is very rapidly reduced to zero, which is the speed of movement of the object 50. The central part of the printed circuit board constituting the sensor unit 7 between the supports 10 continues to move forwardly, but with a damped motion, so that $V_b$, the velocity of the central part of the printed circuit board, reduces. The printed circuit board reaches its maximum forward movement at a time $T_o/4$ after $T_i$, where $T_o$ is the period for a complete vibration at the natural resonant frequency of the printed circuit board. It can be seen that the central part of the printed circuit board is consequently accelerated in the opposite sense, with $v_b$ thus increasing again, as shown in phantom in FIG. 17, thus effectively moving back towards the initial position, but actually moves through the initial position to continue to vibrate.

It can be seen in FIG. 17 that the velocity of the vehicle $v_c$ declines gradually following the impact. This particular decline of velocity does depend upon the nature of the impact and the nature of the crumpling of any crumple zones. However, it can be seen that the decay of velocity of the vehicle extends over a much longer period of time than the initial vibrations of the printed circuit board.

Figure 18:
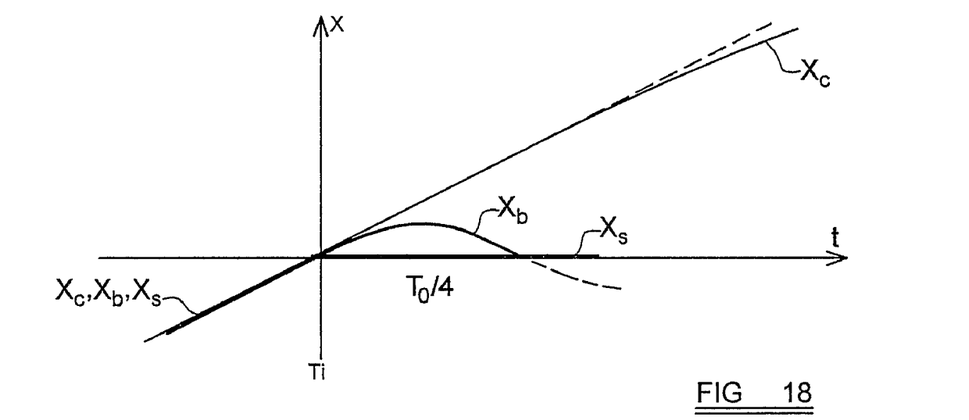
FIG. 18 is a graphical figure provided for purposes of explanation.

Turning now to FIG. 18 which illustrates, graphically, the displacement of various parts of the system during an impact situation, with particular reference to $x_c$ which is the displacement of the complete vehicle, $x_b$ which is the displacement of the central part of the printed circuit board between the supports 10 and $x_s$ which is the displacement of the supports themselves.

As can be seen from FIG. 18 initially the vehicle, the printed circuit board and the supports are all being displaced uniformly with respect to time. At the moment of the impact $T_i$, all movement of the supports $x_s$ is terminated, while the central part of the printed circuit board is initially decelerated, over a period of time equal to $T_o/4$, and is then re-accelerated back towards its initial position. The vehicle gradually decelerates from the straight line, which is shown in phantom, over a relatively long period of time as compared with the time taken for the printed circuit board to oscillate.

The deformation of the outer skin of the vehicle is $x_c - x_s = x_c$ (t>o).

Consequently, it is to be appreciated that $$v_b = v_{rel} \cdot \cos\omega_o t$$

where $$\omega_0 = 2\pi f_o = \frac{2\pi}{T_0}$$

where $f_o$ is the natural resonance frequency of the printed circuit board as the central part of the printed circuit board is displaced relative to its supports.

Also it is to be appreciated that:

$$(x_b - x_s) = x_b(t > o) = \int v_b dt$$
$$= \frac{v_{rel}}{\omega_o} \cdot \sin\omega_0 t = \frac{T_o v_{rel}}{2\pi} \sin\omega_0 t$$
$$= x_{bmax} \sin\omega_0 t$$

where $x_{bmax}$ is the maximum displacement of the central part of the printed circuit board forming the sensor unit 7 between the supports 10.

Figure 19:
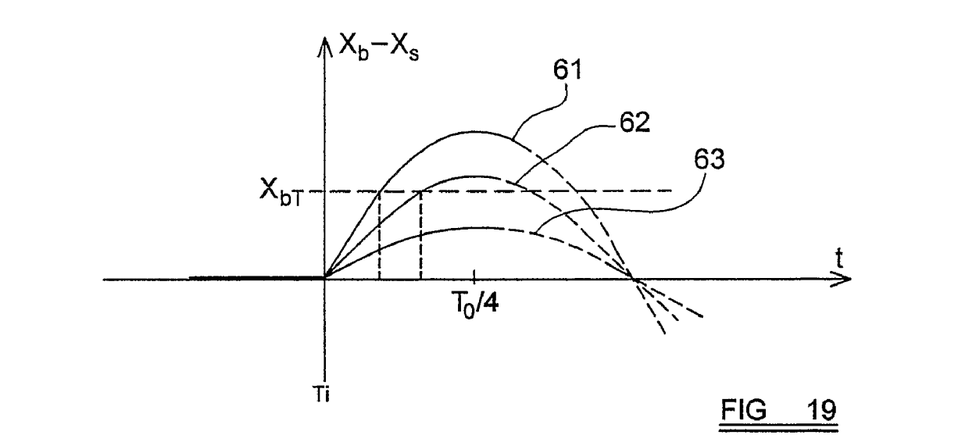
FIG. 19 is a graphical figure provided for purposes of explanation.

For example if $v_{rel}$=14 m/s and $T_o$=8 ms then $X_{bmax} = 8 \cdot 14/(1000 \cdot 2\pi) \approx 20$ mm and $x_c(t=T_o/4) = 2$ ms·14 m/s≈30 mm FIG. 19 is a graphical view illustrating $x_b - x_S$ plotted against time following the instant of impact $T_i$. The first plot 61 is for a relative velocity of 20 m/s, the second plot 62 is for a relative velocity of 14 m/s and the third plot 63 is for a relative velocity of 6 m/s. It can be seen that each plot has a maximum at a period of time $T_o/4$ at 2 m/s after the incident impact $T_i$.

It will be understood that the sensor will preferably generate a signal to actuate a safety device in response to a movement of the central part of the printed circuit board in excess of a threshold $x_{bT}$. This means that $x_b$ will only reach the threshold $x_{bT}$ if $x_{bmax} \geq x_{bT}$. FIG. 19 shows $x_{bT}$=16 mm. $X_{bmax}$=16 mm corresponds to $v_{rel}$=12 m/s.

The design of the system has to select critical parameters such as $x_{bT}$, that is to say threshold for movement of the central part of the printed circuit board and $T_o$ which is the period for a complete vibration, at the natural resolution frequency, of the printed circuit board.

If the system designer wishes to create a practicable system, the system designer has to create a system which will generate a trigger signal when an impact occurs when the relative velocity in the impact situation exceeds a threshold velocity $v_{cT}$.

Typically, the system designer wishes to create a trigger signal only if the $v_{rel} = v_c \geq$ the threshold velocity $v_{cT}$, which, for the sake of example, may be selected to be 5 m/s. It is to be noted that the lateral velocity of the vehicle $v_c$ is equal to $v_{rel}$ in the case of an impact with a stationary objection.

It is to be understood that the triggering signal is to be generated only if the deformation $x_c$>(a deformation threshold $x_{cT}$), which for $v_c$=5 m/s could be selected to be 5 mm. It is also to be noted that $x_{cT}$ is a function of $v_c$. The deformation threshold $x_{cT}$, is made big enough to avoid inadvertent generation of a triggering signal, for example in response to part of a vehicle being kicked.

In the example given, the latest trigger signal is created at $$t_{smax} = x_{cT}/v_{cT} = (5 \text{ mm})/(5 \text{ m/s}) = 1 \text{ ms}$$

$x_{bmax}$ should thus occur at $t = T_o/4 = t_{smax} \geq t_s$.

This means that:

$$T_o > 4 \text{ ms}.$$

$$x_{bT} = x_{bmax}(v_c = 5 \text{ m/s}) = \frac{T_o \cdot v_{rel}}{2\pi} > \frac{4 \cdot 5}{2\pi} \approx 3 \text{ mm}.$$

Thus, it is consequently believed that in a typical situation $X_{bT}$ is preferably between 3 and 30 mm and $T_o$ is preferably between 2 and 20 m/s. $T_o$=2 m/s corresponds to the embodiment of FIG. 23. The speed threshold $v_{cT}$ is preferably 5 to 20 m/s, which corresponds approximately to a vehicle speed of between 15 and 60 kilometers per hour.

Figure 20:
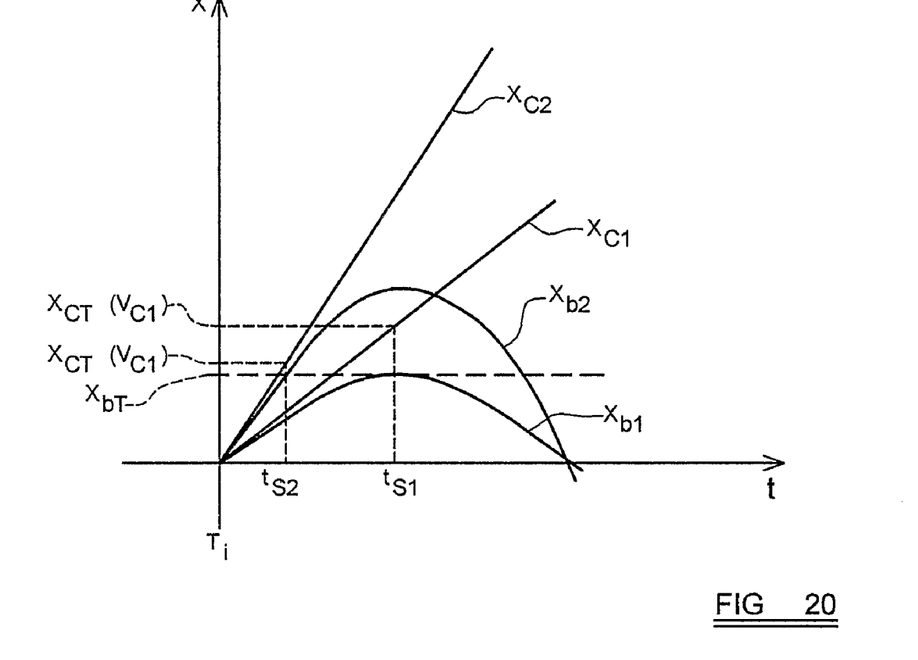
FIG. 20 is a graphical figure provided for purposes of explanation.

FIG. 20 is a graphical figure plotting the displacement of part of a vehicle and the displacement of the central part of the printed circuit board forming a sensor of the invention against time during two impact situations where the initial velocity of the vehicle is, respectively, relatively slow and relatively fast. In a relatively slow impact situation, $(v_c = v_{c1})$, the deformation of part of the vehicle, with time, following the instant of impact $T_i$ is illustrated by the line $x_{c1}$. The deformation is substantially uniform with time during the first instance of the impact. As a consequence of the deformation of the vehicle as shown by the line $x_{c1}$, the central part of the printed circuit board of the associated sensor executes the movement shown by the line $x_{b1}$. The line reaches the threshold value $x_{bT}$ at an instant $t_{s1}$. The triggering signal is thus generated. In contrast, however, when the initial vehicle speed is greater $(v_c = v_{c2})$, the deformation of the vehicle, in the impact situation, is shown by the line $x_{c2}$. The deformation of the central part of the printed circuit board is shown by the line $x_{b2}$. This line $x_{b2}$ passes the threshold value $x_{bT}$ at a much earlier instant $T_{s2}$. Thus in high speed impact, the triggering signal is generated before the instant at which the triggering signal would be generated in a slower speed impact. It is to be understood that the degree of deformation required before a triggering signal is generated in a low speed impact, $x_{cT}(v_{c1})$ is greater than the absolute degree of deformation required to generate the triggering signal in a high speed impact $x_{cT}(v_{c2})$.

Figure 21:
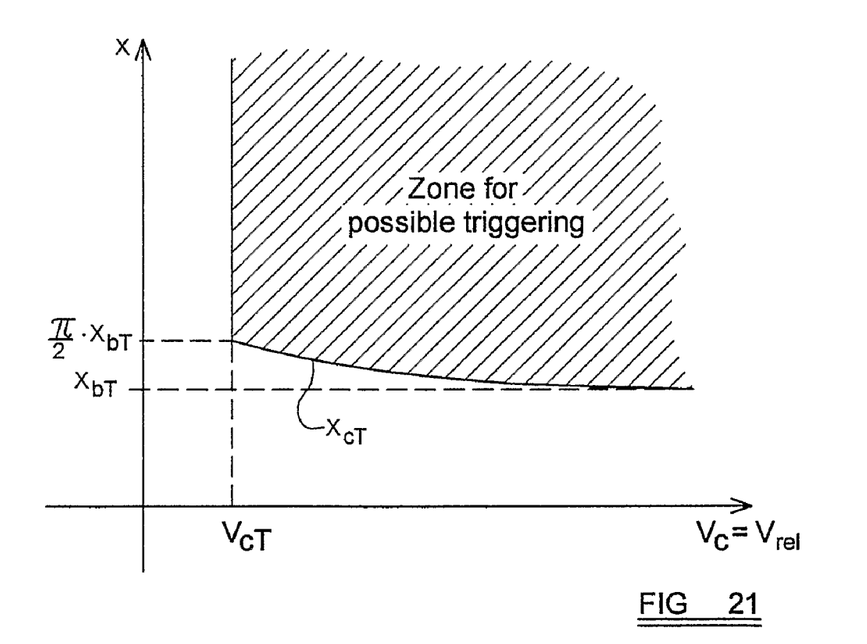
FIG. 21 is a further graphical figure provided for purposes of explanation.

FIG. 21 is a graphical figure in which deformation of the vehicle $x_c$ is plotted against $v_c$, which is taken to be the relative velocity of the impact.

It is to be appreciated that an output signal is generated at $T_s$ when $x_b$, the maximum movement of the central part of the printed circuit board reaches a threshold value $x_{bT}$.

$$x_b = x_{bmax} \cdot \sin\omega_0 t$$

$$x_{bmax} = \frac{T_o \cdot v_c}{2\pi}$$

i.e. $v_c = \frac{2\pi \cdot x_{bT}}{T_o}$

The velocity threshold $$v_{cT} = v_c(x_{bmax} = x_{bT}) = \frac{2\pi \cdot x_{bT}}{T_o}$$

The deformation threshold $x_{cT} = x_c(t_s) = v_c \cdot t_s$, (as $x_c = v_c \cdot t$)

$$x_{cTmax} = x_{cT}(v_c = v_{cT}) = v_{cT}\frac{T_o}{4} = \frac{2\pi \cdot x_{bT}}{T_o} \cdot \frac{T_o}{4} = \frac{\pi}{2}x_{bT}$$

From FIG. 21 it can be concluded that when $X_{bmax} \to \infty$ that is to say when $v_c \to \infty$, then $x_{cT} \to x_{bT}$.

The output signal will only be generated if $v_c \geq v_{cT}$ and $x_c \geq x_{cT}$ $$x_{cT} = f(v_c), \frac{\pi}{2}x_{bT} \geq x_{cT} > x_{bT}$$

Consequently it is to be appreciated the arrangement described is speed responsive, with regard to the relative speed of impact between the vehicle and the impacting object.

Figure 22:
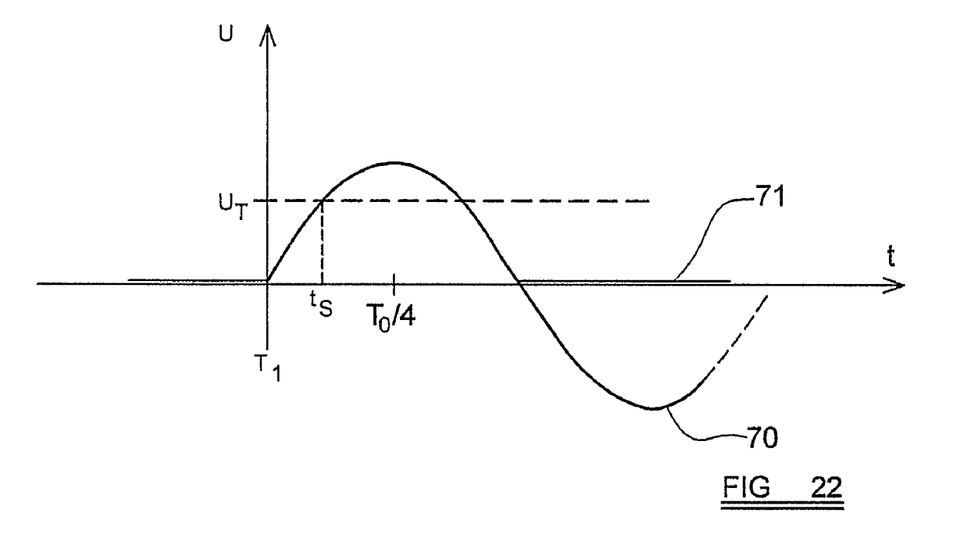
FIG. 22 is another graphical figure provided for purposes of explanation.

Turning now to FIG. 22, a typical output view from a tap from a pair of interconnected resistors, such as the resistors R5 and R6 is FIG. 7 is illustrated before and after an incident of impact $T_i$. It can be seen that before the impact, the output voltage at the tap has a constant level. Following the impact, as the printed circuit board flexes, the potential rises to peak at $T_o/4$ after the impact $T_i$, where $T_o$ is the period of oscillation of the printed circuit board at its natural resonant frequency. As can be seen, the output passes a threshold value $U_T$ at a period of time before $T_o/4$, thus the trigger signal is generated at time $t_s$.

It is to be appreciated that the line 70 shows the situation where the printed circuit board is free to oscillate as in the embodiments particularly shown in FIGS. 2 to 4, whereas the line 71 shows the position where the printed circuit board is not free to oscillate, as in the embodiment of FIG. 10.

Figure 23:
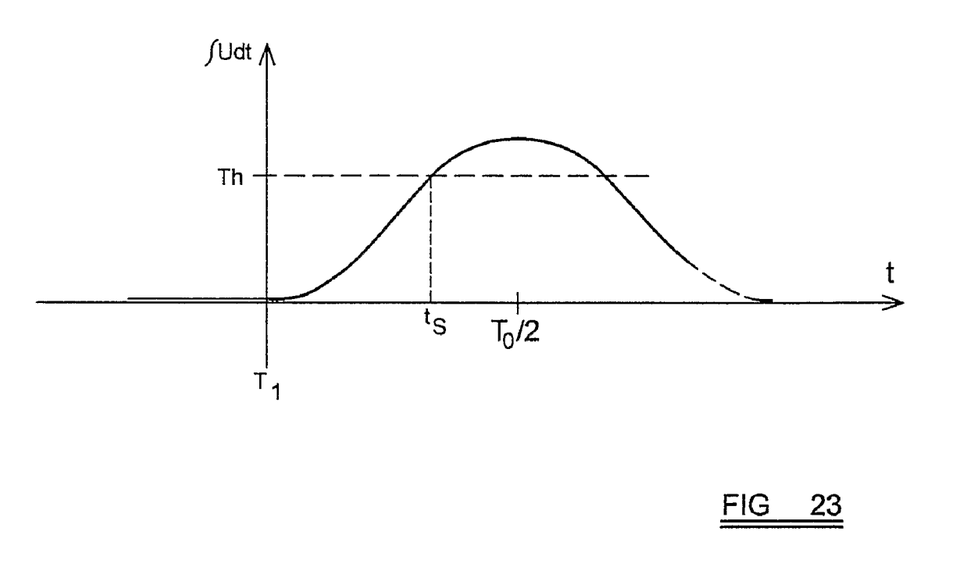
FIG. 23 is yet another graphical figure provided for purposes of explanation.

FIG. 23 shows the situation where the output signal from the tap is integrated before being passed to the comparator. In this embodiment, the integrated output signal reaches a maximum of $T_o/2$. The output is compared with a threshold value $T_h$, which is set at an appropriate level causing the creation of a triggering signal at instant $t_s$.

Because the maximum of the integral of U occurs much later than the maximum of the voltage U, $t_s$ in the arrangement shown in FIG. 1 can be allowed to be much later that $t_s$ in the arrangement of FIG. 20, if the resonance frequency $f_o$ is the same. Alternatively, a higher resonant frequency $f_o$ can be permitted.

In at least one embodiment, the supports have a minimum spacing of 50 mm for each sensor unit. The distance between the supports for a single sensor unit may be, however, in the range of 100 to 300 mm. It is preferred that the free space behind the printed circuit board is at least 5 mm deep where the printed circuit board is to oscillate. This is to help ensure that the radius of the bend is sufficiently small to provide an appropriate strong output signal caused by a substantial change in the value of the resistors on the opposed sides of the printed circuit board.

The printed circuit board is provided with an appropriate resonant frequency by selecting the stiffness of the printed circuit board to an appropriate level relative to the mass of the printed circuit board. If the printed circuit board is too flexible or soft, a low speed impact would result in a big displacement. In at least one embodiment the maximum amplitude of the displacement of the printed circuit board is substantially proportional to the impact speed. The stiffer the printed circuit board, the earlier that the maximum displacement will occur. It is to be understood that the maximum displacement occurs at incident $T_o/4$ where $T_o$ is the period for resonance over the printed circuit board at its natural resonance frequency $f_o$.

In at least one embodiment, in an impact situation there is an instant, a short period of time after the impact has begun, by which the sensor discriminates a dangerous impact from a less dangerous impact, to enable a safety device to be triggered appropriately and early enough for a dangerous impact. This may be called the "latest possible instant". Consequently, the maximum displacement of the printed circuit board should occur preferably before, although possibly very shortly after this latest possible instant. Consequently, it is generally preferable to make the printed circuit board relatively stiff. If the printed circuit board is stiff, during oscillation of the printed circuit board, the printed circuit board will reach its maximum displacement and start to reverse its movement before the latest possible instant is reached. Consequently a valuable and meaningful signal can be generated from the sensor early enough to enable some detailed processing to be performed before the latest possible instant has been reached. In at least one other embodiment, if the threshold is passed in any particular accident situation, this should occur, at the latest, when the maximum displacement of the printed circuit board is achieved, if the sensor is directly measuring the displacement of the printed circuit board without any integration of an output signal from the resistors. If, however, the output signal of the resistors is integrated, then the threshold may be reached before the displacement returns to its original position, that is before a time period of $T_o/2$ has elapsed following the incident of impact $T_i$.

Whilst the invention has been described with reference to embodiments in which the sensor utilizes a conventional printed circuit board, any form of deformable strip carrying the resistors may be utilized.

It is to be understood that each sensor unit has effectively two spaced apart pairs of supports, one pair of supports being at each end of the sensor unit. The signal from the sensor unit represents an average of the motion of the supports at each end of the sensor unit. The maximum amplitude of the printed circuit board represents the relative speed, and so the described arrangement, which includes the threshold comparator, can be considered to provide an output which is related to relative speed of impact.

In preferred embodiments of the invention, the stiffness of the printed circuit board relative to its mass is adapted to give a period of oscillation $T_o$ which is four times the longest possible time to trigger. This means that the signal represents high passed filter displacements.

Whilst the invention has been described with reference to door mounted sensors, it is to be understood that the described sensors may be mounted anywhere adjacent the exterior of a vehicle, in the front, at the rear or on the sides.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. An impact sensor for sensing an impact in a vehicle, the sensor comprising an elongate yieldable element and a support arrangement for supporting opposed ends of the yieldable element on a vehicle mounting surface that is defined by one of an outer skin of the vehicle and a component adjacent to the outer skin of the vehicle, the support arrangement configured such that free space is provided between a central part of the yieldable element extending between the opposed ends and the vehicle mounting surface to allow relative movement between the central part of the yieldable element and the vehicle mounting surface for bending of the yieldable element, the yieldable element substantially parallel with outer skin of the vehicle, wherein the yieldable element includes a sensor arrangement response to bending of the yieldable element that generates at least one signal in response to the yieldable element being bent, wherein the yieldable element has a stiffness and mass such that a period for a complete oscillation of the yieldable element is at a resonance frequency of at least 2 milliseconds.

2. An impact sensor according to claim 1 wherein the period for the complete oscillation is between 5 milliseconds and 20 milliseconds.

3. An impact sensor according to claim 1 wherein the support arrangement supports the opposed ends of the yieldable element that are spaced apart by a distance of at least 50 millimeters.

4. An impact sensor according to claim 1 wherein the support arrangement supports the yieldable element at spaced apart locations between 100 and 300 millimeters.

5. An impact sensor for sensing an impact in a vehicle, the sensor comprising an elongate yieldable element and a plurality of supports that support opposed ends of the yieldable element on a vehicle mounting surface that is defined by one of an outer skin of the vehicle and a component adjacent to the outer skin of the vehicle, the supports configured such that free space is provided between a central part of the yieldable element extending between the opposed ends and the vehicle mounting surface to allow relative movement between the central part of the yieldable element and the vehicle mounting surface for bending of the yieldable element, the yieldable element substantially parallel with the outer skin of the vehicle, wherein the yieldable element includes a sensor arrangement responsive to bending of the yieldable element that generates at least one signal in response to the yieldable element being bent, the supports respectively supporting the opposed ends being spaced apart by a distance of at least 50 millimeters.

6. An impact sensor according to claim 5 wherein the distance between the supports respectively supporting the opposed ends is between 100 and 300 millimeters.

7. An impact sensor according to claim 5 wherein the yieldable element has a stiffness and a mass such that a period for a complete oscillation of the yieldable element is at a resonant frequency of at least 2 milliseconds.

8. An impact sensor according to claim 5 wherein the impact sensor is mounted in the vehicle.

9. An impact sensor according to claim 5 wherein the impact sensor forms part of a strip wherein the strip includes a plurality of sensors substantially identical to the impact sensor.

10. An impact sensor according to claim 9 wherein the yieldable element is one of a plurality of elongate yieldable elements of the sensors in the strip of sensors.

11. An impact sensor for sensing an impact in a vehicle, the sensor comprising an elongate yieldable element and a plurality of supports that support opposed ends of the yieldable element on one of an outer skin of the vehicle and a component adjacent to the outer skin of the vehicle, the yieldable element substantially parallel with the outer skin of the vehicle, wherein the yieldable element includes a sensor arrangement responsive to bending of the yieldable element that generates at least one signal in response to the yieldable element being bent, the supports respectively supporting the opposed ends being spaced apart by a distance of at least 50 millimeters, wherein the impact sensor forms part of a strip wherein the strip includes a plurality of sensors substantially identical to the impact sensor, the yieldable element is one of a plurality of elongate yieldable elements of the sensors in the strip of sensors, and the yieldable element has a weak mechanical coupling between adjacent sensors.

12. An impact sensor according to claim 11 wherein the weak mechanical coupling includes a plurality of cuts extending from opposite sides of the yieldable element.

13. An impact sensor for sensing an impact in a vehicle, the sensor comprising an elongate yieldable element and a plurality of supports that support opposed ends of the yieldable element on one of an outer skin of the vehicle and a component adjacent to the outer skin of the vehicle, the yieldable element substantially parallel with the outer skin of the vehicle, wherein the yieldable element includes a sensor arrangement responsive to bending of the yieldable element that generates at least one signal in response to the yieldable element being bent, the supports respectively supporting the opposed ends being spaced apart by a distance of at least 50 millimeters, wherein the impact sensor forms part of a strip wherein the strip includes a plurality of sensors substantially identical to the impact sensor, and the sensors comprise a plurality of resistors mounted on opposed faces of the yieldable element and a processor for processing the signals from the resistors.

14. An impact sensor according to claim 13 wherein each sensor includes one resistor on each side of a corresponding yieldable element, the resistors being connected to form a voltage divider connected to a source of potential, each sensor further including a tap connected to a junction between the resistors, the taps being connected to a processor.

15. An impact sensor according to claim 13 wherein each sensor is provided with two resistors on each side of the yieldable element, the resistors being connected to form a Wheatstone bridge.

16. An impact sensor according to claim 13 wherein each resistor is formed by a conductive tract formed on one face of the yieldable element.

17. An impact sensor for sensing an impact in a vehicle, the sensor comprising an elongate yieldable element and a plurality of supports that support opposed ends of the yieldable element on one of an outer skin of the vehicle and a component adjacent to the outer skin of the vehicle, the yieldable element substantially parallel with the outer skin of the vehicle, wherein the yieldable element includes a sensor arrangement responsive to bending of the yieldable element that generates at least one signal in response to the yieldable element being bent, the supports respectively supporting the opposed ends being spaced apart by a distance of at least 50 millimeters, and the yieldable element is a printed circuit board.

18. An impact sensor for sensing an impact in a vehicle, the sensor comprising an elongate yieldable element and a plurality of supports that support opposed ends of the yieldable element on one of an outer skin of the vehicle and a component adjacent to the outer skin of the vehicle, the yieldable element substantially parallel with the outer skin of the vehicle, wherein the yieldable element includes a sensor arrangement responsive to bending of the yieldable element that generates at least one signal in response to the yieldable element being bent, the supports respectively supporting the opposed ends being spaced apart by a distance of at least 50 millimeters, and the yieldable element comprises a thermoset reinforced resin core and conductive tracts formed on each of two opposed faces of the core.

19. An impact sensor according to claim 5 wherein the supports are formed integrally with a tube, the yieldable element being mounted within the tube.

20. An impact sensor for sensing an impact in a vehicle, the sensor comprising an elongate yieldable element and a plurality of supports that support opposed ends of the yieldable element on one of an outer skin of the vehicle and a component adjacent to the outer skin of the vehicle, the yieldable element substantially parallel with the outer skin of the vehicle, wherein the yieldable element includes a sensor arrangement responsive to bending of the yieldable element that generates at least one signal in response to the yieldable element being bent, the supports respectively supporting the opposed ends being spaced apart by a distance of at least 50 millimeters, and wherein movement of a central portion of the yieldable element disposed between the supports is restricted in one direction such that complete oscillation is prevented.

21. An impact sensor according to claim 20 wherein a damping layer is located adjacent to a face of the yieldable element.

22. An impact sensor for sensing impact in a vehicle, the sensor comprising an elongate yieldable element, and a support arrangement for supporting opposed ends of the yieldable element on one of an outer skin of the vehicle and a component adjacent the outer skin of the vehicle, the yieldable element substantially parallel with the outer skin of the vehicle, wherein the yieldable element includes a sensor arrangement responsive to bending of the yieldable element that generates at least one bend signal in response to the yieldable element being bent, the sensor arrangement including sensors that generate an output signal when the bend signal exceeds a threshold, wherein no output signal will be generated if the impacting speed is below a predetermined speed threshold or if the deformation of the outer skin is below a predetermined deformation threshold.

23. An impact sensor according to claim 22 wherein a natural period of oscillation of the yieldable element $T_0$ is approximately four times a period of time between an instant of impact and a latest possible instant corresponding to said speed threshold for generating the output signal.

24. An impact according to claim 22 wherein an output signal is generated in response to a movement of a central part of the yieldable element in excess of a bend threshold which is about 3 and 30 mm.

25. An impact sensor according to claim 22 wherein the speed threshold is between about 15 and 60 kilometers per hour.

26. An impact sensor according to claim 22 wherein a free space of at least 5 millimeters is adjacent to at least one side of the yieldable element.

27. An impact sensor according to claim 22 wherein the impact sensor is mounted on an adjacent exterior portion of the vehicle.

28. An impact sensor according to claim 22 wherein the impact sensor is mounted directly to the outer skin of the vehicle.

29. An impact sensor according to claim 22 wherein the impact sensor is mounted to an internal reinforcing element, the internal reinforcing element being mounted immediately adjacent a skin of the vehicle.

30. An impact sensor system for sensing an impact in a vehicle, the impact sensor comprising an elongate yieldable strip, the strip comprising at least two elongate yieldable elements disposed along the strip, each yieldable element supported by a support arrangement at opposed ends of the yieldable element disposed directly on a vehicle mounting surface that is defined by one of an outer skin of the vehicle and a component adjacent the outer skin of the vehicle, the support arrangement configured such that free space is formed between a central part of the yieldable element extending between the opposed ends and the vehicle mounting surface to allow relative movement between the central part of the yieldable element and the vehicle mounting surface for bending of the yieldable element, the yieldable element substantially parallel with the outer skin of the vehicle, wherein the yieldable strip includes at least one sensor arrangement, each sensor arrangement being responsive to bending of at least one of the yieldable elements such that at least one signal is generated in response to at least one yieldable element being bent.

31. An impact sensor system according to claim 30 wherein each yieldable element includes one of the sensors or sensor arrangements.

32. An impact sensor for sensing an impact in a vehicle, the sensor comprising an elongate yieldable element and a support arrangement including supports which are spaced apart by a distance of at least 50 millimeters to support opposed ends of the yieldable element directly on one of an outer skin of the vehicle and a component adjacent the outer skin of the vehicle, the yieldable element substantially parallel with the outer skin of the vehicle, the yieldable element including a sensor arrangement responsive to bending of the yieldable element such that at least one signal is generated in response to the yieldable element being bent, the yieldable element having a stiffness and a mass such that a period for a complete oscillation of the yieldable element is at a resonance frequency of between 5 milliseconds and 20 milliseconds, the sensor arrangement forming part of a strip which includes a plurality of substantially identical sensor arrangements, the yieldable element being included with a plurality of the elongate yieldable elements of the sensor arrangements in the strip, the yieldable element having a weak mechanical coupling between adjacent sensor arrangements, the weak mechanical coupling including a plurality of cuts extending from opposite sides of the yieldable element.

\* \* \* \* \*